United States Patent
Iino

[11] Patent Number: 5,291,184
[45] Date of Patent: Mar. 1, 1994

[54] HEAD UP DISPLAY FOR A VEHICLE HAVING A LIQUID CRYSTAL INDICATOR AND A REFLECTING PRISM

[75] Inventor: Tadashi Iino, Shizuoka, Japan
[73] Assignee: Yazaki Corp., Tokyo, Japan
[21] Appl. No.: 834,179
[22] Filed: Feb. 7, 1992
[30] Foreign Application Priority Data
  Feb. 8, 1991 [JP] Japan .............. 3-011132[U]
[51] Int. Cl.⁵ .................................. G09G 3/02
[52] U.S. Cl. .............................. 345/7; 359/630; 359/640; 359/40
[58] Field of Search ............ 340/705, 784, 980; 359/41, 40, 42, 630, 618, 629, 640, 13

[56] References Cited

U.S. PATENT DOCUMENTS

| | | | |
|---|---|---|---|
| 4,218,302 | 8/1980 | Dalisa et al. | 359/296 |
| 4,367,923 | 1/1983 | Ishikawa | 340/705 |
| 4,756,604 | 7/1988 | Nakatsuka et al. | 359/41 |
| 4,913,529 | 4/1990 | Goldenberg et al. | 359/629 |
| 5,005,009 | 4/1991 | Roberts | 340/705 |
| 5,028,119 | 7/1991 | Hegg et al. | 340/705 |
| 5,157,549 | 10/1992 | Suzuki et al. | 340/705 |

FOREIGN PATENT DOCUMENTS 2050744 4/1991 Japan .

Primary Examiner—Tommy P. Chin
Assistant Examiner—A. Au
Attorney, Agent, or Firm—Armstrong, Westerman, Hattori, McLeland & Naughton

[57] ABSTRACT

Display apparatus for a vehicle in which the quality of the display image of the indicator is enhanced and displayed content of the display image can be changed without restraint. The display apparatus for a vehicle consists of a indicator and a prism which are integral with each other. On a third surface of the prism where the prism is held in contact with the indicator is formed a transparent electrode. Along an edge portion of a second surface is printed a spacer and a cover grass is mounted thereon. On an inner surface of the cover glass is formed a dot-matrix-type transparent electrode. Further, between the surface and the cover glass is sealed a nematic liquid crystal to form a twisted nematic cell (TN). On the cover glass is further disposed a polarizing plate, a dispersion plate, and a backlight.

5 Claims, 2 Drawing Sheets

HEAD UP DISPLAY FOR A VEHICLE HAVING A LIQUID CRYSTAL INDICATOR AND A REFLECTING PRISM

BACKGROUND OF THE INVENTION

1. Field of the Invention

The present invention relates to a display apparatus for a vehicle in which a display image of an indicator showing driving information such as vehicle speed is reflected by a part of the windshield near dashboard toward a driver's seat side so that the driver can see the driving information.

2. Description of Related Art

The apparatus of this kind that is currently in use is shown in FIG. 2. The display apparatus has an indicator 21, which shows the vehicle speed or the like, installed in a dashboard 22 near a windshield 23. A dark reflecting portion 23a is formed on a part of the windshield 23 near the boundary with the dashboard 32. The display image of the indicator 21 is reflected by the reflecting portion 23a on the inner surface of the windshield 23 toward the driver's seat side, thus forming a so-called a head-up display.

In this arrangement, the display appears against the dark background of the reflecting portion 23a within a viewing field of the windshield 23, permitting a driver to easily see the display without having to shift his or her sight line greatly. Another advantage is that since the background of the display is dark, the display can be clearly seen with a good contrast.

In the conventional display apparatus mentioned above, however, not only the dark reflecting portion 23a can be noticed also from outside the vehicle and this mars the appearance of the car but also sight line of the driver is interrupted by the dark reflecting portion 23a. Since the reflecting portion 23a is formed on the windshield 23, there are limitations on the manufacturing process and the maintenance work is difficult.

The applicant has already proposed a display apparatus for a vehicle in Japanese Utility Model Application No. Heisei 2-050744, in which above problems are solved. As described in FIG. 3, the display apparatus for a vehicle has a triangular prism 12 adjacent to a windshield 11 reference numberal 15 indicates a dashboard of the vehicle. On the lower surface 12C of the prism 12 is mounted an indicator 13 accommodated in a case 19. A portion excluding a display pattern portion where the display image of the indicator 13 is applied black paint 14.

Display light emitted from the indicator 13 is reflected on a surface 12A of the prism 12 which is in contact with the windshield 14 and transmits through surface 12B to reach driver's viewing point E. When seen from the viewing point E, the display image of the indicator is recognized within a front view with dark background. On the other hand, when seen from outside of the vehicle, the prism is recognized as transparent body so that the external appearance of the vehicle is not marred. Moreover, the prism 12 is mounted independently from the windshield 11, which does not limit production process of the windshield and makes the maintenance work easier.

Reference numerals 16, 17, and 18 show a motor, a cam, and a spring respectively. They are used for releasing the indicator from the lower surface of the prism 12 when the indicator is turn off to prevent a dark portion from being reflected on the windshield 14.

As described above, although the above display apparatus for a vehicle can solve aforementioned problems, when external light such as sun light enters the indicator of the vehicle from the windshield 11 or the like, the external light is reflected on the display pattern portion even when the indicator 13 is not turned on, so that the display pattern portion is recognized as if the display patter portion were indicated. Further, a portion excluding the display pattern portion is applied black paint 14 to display the display image with dark background, which limits displayed content of the display apparatus.

SUMMARY OF THE INVENTION

It is therefore the object of the present invention to provide a display apparatus for a vehicle in which quality of the display image of the indicator is enhanced and the displayed content of the display apparatus can be changed without restraint.

A display apparatus for a vehicle according to the present invention in which a display image of an indicator with a display surface thereof facing up is reflected by a reflection member disposed near a dashboard within a viewfield of a windshield so as to be recognized by a driver, characterized in that: the reflection member is a prism; a first surface and a second surface of the prism join at an apex of the prism; the first surface is a reflection surface; and the indicator is a liquid crystal indicator with a backlight and is held in contact with the third surface.

According to the above structure, display light emitted from the display image of the liquid crystal indicator transmits the third surface of the prism and further proceeds in the prism to transmit the second surface, reaching the driver's viewing point E. When seen from the driver's viewing point, the display image of the indicator is recognized within a front view with dark background. When the indicator is not turn on, even when external light enters the indicator of the vehicle from the windshield, the external light is not reflected on the display pattern portion since the indicator consists of liquid crystal elements, so that the display pattern portion is not recognized as if the display patter portion were indicated. Further, use of the liquid crystal indicator permits displayed content of the display image to be determined without restraint.

BRIEF DESCRIPTION OF THE DRAWINGS

The present invention will be more apparent from the ensuring description with reference to the accompanying drawing wherein.

DETAILED DESCRIPTION OF PREFERRED EMBODIMENTS

Now, embodiments of the present invention will be explained with reference to drawings.

Figure 1:
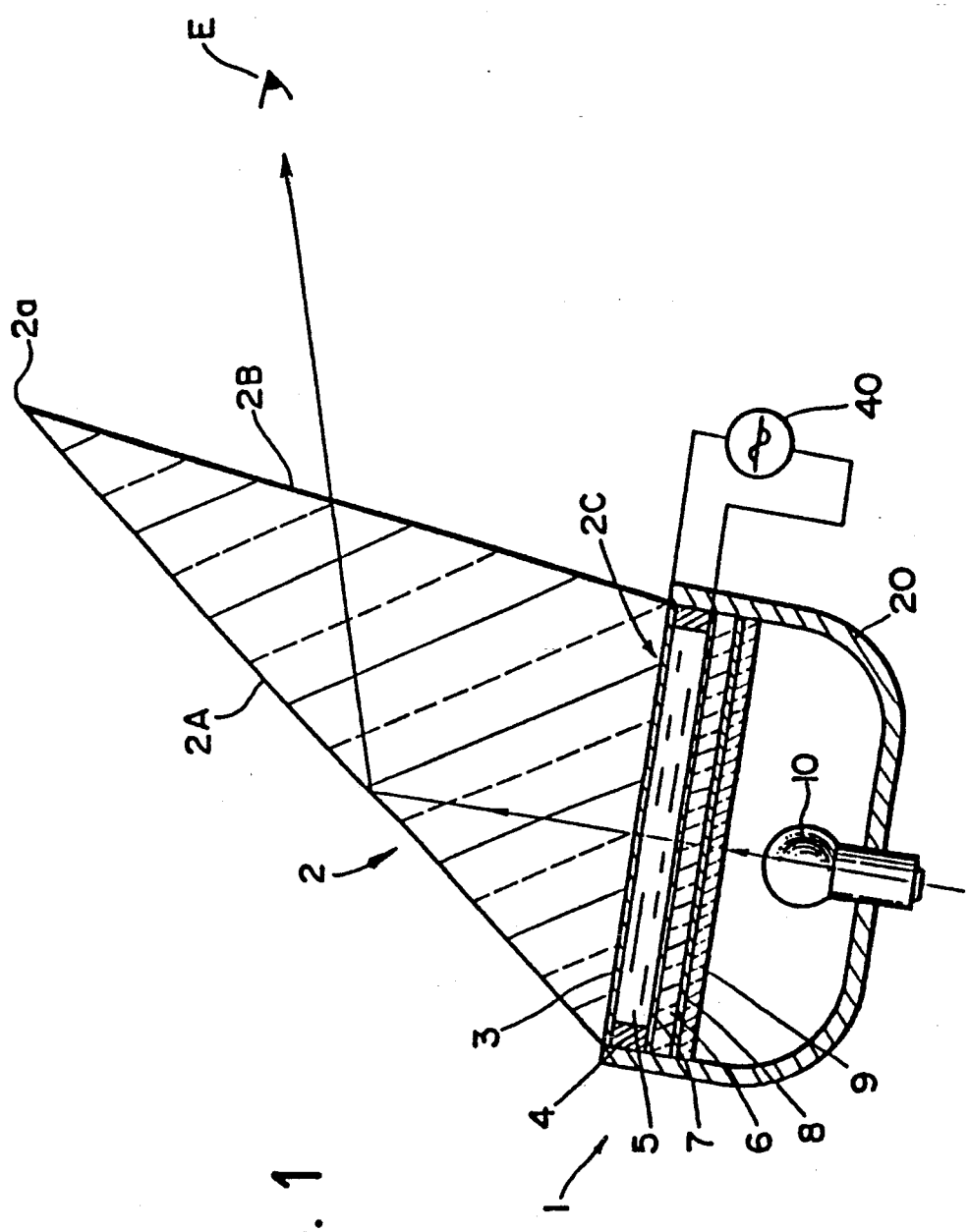
FIG. 1 is a cross sectional view of a display apparatus for a vehicle according to one embodiment of the present invention.
Figure 2:
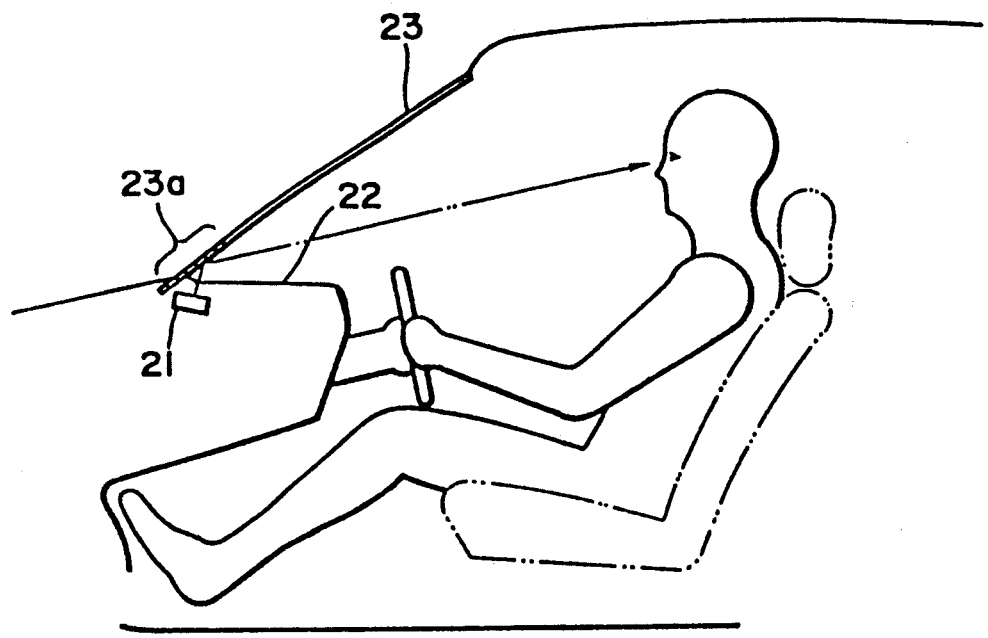
FIG. 2 is a view showing a conventional display apparatus for a vehicle.
Figure 3:
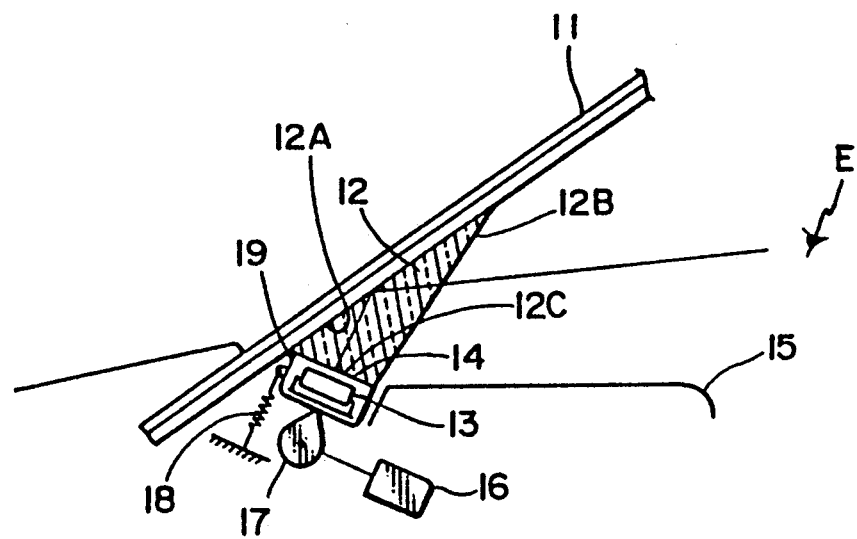
FIG. 3 is a view showing a display apparatus for a vehicle which has already been proposed.

A display apparatus for a vehicle according to the present invention is provided with an indicator 1 and a prism 2, which are integral with each other as shown in FIG. 1. The prism 2 is made of transparent acrylics having a cross section of a right angled triangle. Further, the prism 2 has a first surface 2A and a second surface 2B which joint at an apex 2a of the prism 2. On a third surface 2C is formed a transparent electrode 3 made of indium tin oxide.

Along an edge portion of the third surface 2C, on which the transparent electrode 3 is formed, is printed spacers 4. On the inner surface of the cover glass 6 is formed a transparent electrode 7 of dot-matrix type. Further, nematic liquid crystal 5 with a thickness of around 10 μm is inserted in a portion sealed by the spacers 4 which are put between the second surface 2C and the cover glass 6. As a result, twisted nematic cell (TN) is formed by alignment treatment to the surface 2C and the cover glass.

On the cover glass 6 is mounted a polarizing plate 8 and further mounted a dispersion plate thereon. The polarizing direction of the polarizing plate 8 is determined so that the polarizing plate passes only light having vibrational component thereof which is in a direction, as viewed in FIG. 1, vertical to the paper surface of FIG. 1. A backlight is disposed behind the dispersion plate 9 while being supported by the reflection plate 20. Denoted as 40 is a power source for driving a liquid crystal indicator 1.

Then, the display apparatus for a vehicle according to the present invention is mounted on a dashboard while the first surface 2A of the prism 2 being held in contact with the windshield and the apex 2a of the prism tilting toward the driver's seat side like the display apparatus for a vehicle which has been proposed.

In the above structure, on turning on the backlight 10 of the liquid crystal indicator 1, light is dispersed by the dispersion plate 9 and is polarized by the polarizing plate 8 to have only polarized component vertical to the paper surface of FIG. 1. When the light transmits a liquid crystal layer 5, the light is twisted by 90° and only polarized component parallel to the paper travels to proceed in the prism 2, entering the first surface 2A of the prism 2. As a result, the light polarized component (p-polarized light) vibrating parallel to the incident surface. Therefore, proper adjustment of the incident angle permits light to mostly transmit the first surface 2A of the prism 2 and not to reach the driver's view point E, allowing the indicator to look dark.

Then, when a signal is inputted from the power source to the indicator 1 as operational information, twisting of the liquid crystal of the display pattern portion is eliminated and the light has only polarized component vertical to the paper surface of FIG. 1 when it transmits the portion. Since the light has only polarized component vibrating in the direction vertical to the incident surface (s-polarized light), most of the light is reflected on the first surface 2A. Then, the reflected light transmits the second surface 2B to reach the drivers's view point E, which is recognized as display image emitting light therefrom with dark background.

When polarizing direction of the polarizing plate 8 is changed by 90°, brightness and darkness of the display image and the background are inverted. It is also possible to reverse negative and positive states by one of two liquid crystal layers.

As described above, a twisted-nematic-type liquid crystal indicator is used as an indicator in the above structure. Since the prism 2 is held in contact with the display surface of the liquid crystal indicator and the first surface 2A of the prism 2 has polarizing effect, one polarizing plate can be omitted although two polarizing plates are normally used. Further, the liquid crystal is directly in contact with the third surface 2C of the prism 2 so that even external light enters the third surface 2C, the light is totally absorbed in the liquid crystal layer, preventing the display pattern from being reflected and recognized. Further, the electrode of the liquid crystal indicator 1 has dot-matrix type, allowing overall third surface to be used as a display area and to be used for multiple display.

As explained above, in the display apparatus for a vehicle according to the present invention, even though external light enters from the windshield of the vehicle and falls on the display surface of the indicator, the external light is absorbed in the display surface and the display pattern is not reflected because the indicator consist of liquid crystal elements. As a result, when the indicator is not turned on, the display apparatus is not recognized as an eyesore by the driver. Further, the use of the liquid crystal indicator permits displayed content of the display image to be determined without restraint.

What is claimed is:

1. A display apparatus for a vehicle comprising:
   a liquid crystal indicator with a backlight;
   a prism having a first surface and a second surface joining at an apex of said prism, and a third surface, said prism being disposed near a dashboard within a viewing field of a windshield, a display image of said liquid crystal indicator being reflected on the first surface of said prism so as to be recognized by a driver, said liquid crystal indicator being in contact with said third surface of said prism.

2. A display apparatus for a vehicle as claimed in claim 1, wherein said liquid crystal indicator comprising:
   a first transparent electrode formed on said third surface of said prism;
   spacers printed along an edge portion of said third surface of said prism;
   a cover glass disposed on said spacers;
   a second transparent electrode formed on an inner surface of said cover grass;
   nematic liquid crystal sealed by said third surface of said prism, said cover glass, and said spacers;
   a polarized plate disposed on said cover glass; and
   a dispersion plate disposed on said polarized plate.

3. A display apparatus for a vehicle as claimed in claim 1 wherein said prism is made of transparent acrylics having a cross section of a right angled triangle.

4. A display apparatus for a vehicle, comprising:
   a liquid crystal indicator with a backlight;
   a prism having a first surface and a second surface joined at an apex of said prism, and a third surface, said prism being disposed near a dashboard within a viewing field of a windshield, a display image of said liquid crystal indicator being reflected on the first surface of said prism so as to be recognized by a driver,
   wherein said first surface of said prism is angled as to polarize by reflection light incident thereon from said liquid crystal indicator so as to transmit to the driver generally only light of the reflected component.

5. A display apparatus for a vehicle as claimed in claim 4, wherein said liquid crystal indicator comprises a polarized plate, a nematic liquid crystal disposed between said polarized plate and said prism, and wherein said polarized plate transmits a light component generally perpendicular to that reflected by said first surface of said prism.

* * * * *